United States Patent
Su (12)

(10) Patent No.: US 6,523,799 B2
(45) Date of Patent: Feb. 25, 2003

(54) ADJUSTABLE-HEIGHT STAND

(75) Inventor: Cheng-Min Su, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 09/683,082

(22) Filed: Nov. 15, 2001

(65) Prior Publication Data
US 2002/0153465 A1 Oct. 24, 2002

(30) Foreign Application Priority Data
Apr. 19, 2001 (TW) ......................... 90109460 A

(51) Int. Cl.$^7$ ............................................... F16M 11/04
(52) U.S. Cl. ...................... 248/404; 248/655; 248/656; 248/649; 411/433; 411/437
(58) Field of Search ................... 248/125.1, 125.3, 248/407, 408, 410, 188.8, 649, 650, 651, 653, 655, 656; 411/433, 437

(56) References Cited
U.S. PATENT DOCUMENTS

| | | | | |
|---|---|---|---|---|
| 422,361 A | * | 3/1890 | Alton | 411/433 |
| 3,878,757 A | * | 4/1975 | Puklus, Jr. | 411/433 |
| 4,693,656 A | * | 9/1987 | Guthrie | 408/241 S |
| 5,785,480 A | * | 7/1998 | Difeo | 411/433 |
| 5,868,538 A | * | 2/1999 | Rathbun | 411/433 |
| 5,898,974 A | * | 5/1999 | Boyer | 16/114.1 |

* cited by examiner

Primary Examiner—Leslie A. Braun
Assistant Examiner—Deborah M. Brann
(74) Attorney, Agent, or Firm—Winston Hsu

(57) ABSTRACT

An adjustable-height stand that attaches to a device and allows for rough and fine adjustment of the height of the device. The stand has a screw rod, an adjusting mechanism, and a supporting mechanism. The supporting mechanism attaches to the device. The adjusting mechanism is connected to the supporting mechanism and the screw rod and has two states. In the fine adjustment state, the height is adjusted by turning the screw rod. In the rough adjustment state, the contact between the screw rod and the adjusting mechanism can be broken so that the supporting mechanism can slide up and down the length of the screw rod without turning the screw rod.

9 Claims, 8 Drawing Sheets

ADJUSTABLE-HEIGHT STAND

BACKGROUND OF INVENTION

1. Field of the Invention

The present invention relates to an adjustable-height stand. More specifically, the present invention discloses a stand with fine adjustment and rough adjustment functions.

2. Description of the Prior Art

In a common projector or a related product, an adjustable-height stand is used to adjust the height or angle of elevation of the projector to aim an image onto a screen or wall. Therefore, designing an easy-to-use adjustable-height stand is an important goal for designers.

Please refer to FIG. 1. FIG. 1 is a structural diagram of a stand 10 of a prior art projector. The stand 10 is used to support a projector 12. As shown in FIG. 1, the stand 10 of the prior art projector comprises a screw rod 14, and an adjusting mechanism 16 for supporting the projector 12. The adjusting mechanism 16 comprises a screw hole 1 8 through which it is installed on the screw rod 14. Users rotate the screw rod 14 to drive the adjusting mechanism 16 up and down so as to adjust the height or the angle of elevation of the projector.

However, the design of the stand of the prior art projector is inconvenient for large adjustments. To make an adjustment to the height of the adjusting mechanism 16, users must rotate the screw rod 14 until the adjusting mechanism 16 is at the desired height. For small adjustments, this is a fairly quick operation, but large adjustments can take a long time, as there is no quick way to change the height of the adjusting mechanism 16. In other words, the stand 10 of the prior art projector has a fine adjustment function but does not have a rough adjustment function.

SUMMARY OF INVENTION

It is therefore a primary objective of this invention to provide a stand that has both fine adjustment and rough adjustment functions.

The claimed invention, briefly summarized, discloses a stand for supporting a predetermined device. The stand comprises a screw rod, a supporting mechanism, and an adjusting mechanism. The supporting mechanism supports the predetermined device. The adjusting mechanism is installed on the screw rod and connected to the supporting mechanism for adjusting the height of the supporting mechanism. The adjusting mechanism comprises a hole portion through which the adjusting mechanism is installed on the screw rod. The hole portion comprises an upper U-shaped wall and a lower U-shaped wall. The upper U-shaped wall is positioned on a front-upper region of the hole portion, the upper U-shaped wall having a first screw thread. The lower U-shaped wall is positioned on a back-lower region of the hole portion, the lower U-shaped wall having a second screw thread. The upper and lower U-shaped walls are positioned opposite each other and can separate from the screw rod. When the upper and lower U-shaped walls contact with the screw rod, the adjusting mechanism is moved up and down by rotating the screw rod, and when the upper and lower U-shaped walls separate from the screw rod, the adjusting mechanism is capable of sliding along the screw rod.

It is an advantage of the claimed invention that the adjusting mechanism can tilt at an angle in order to separate from the screw rod. This allows the supporting mechanism to slide along the screw rod. The claimed invention stand provides both fine adjustment and rough adjustment functions.

These and other objectives of the present invention will no doubt become obvious to those of ordinary skill in the art after reading the following detailed description of the preferred embodiment, which is illustrated in the various figures and drawings.

DETAILED DESCRIPTION

Figure 1:
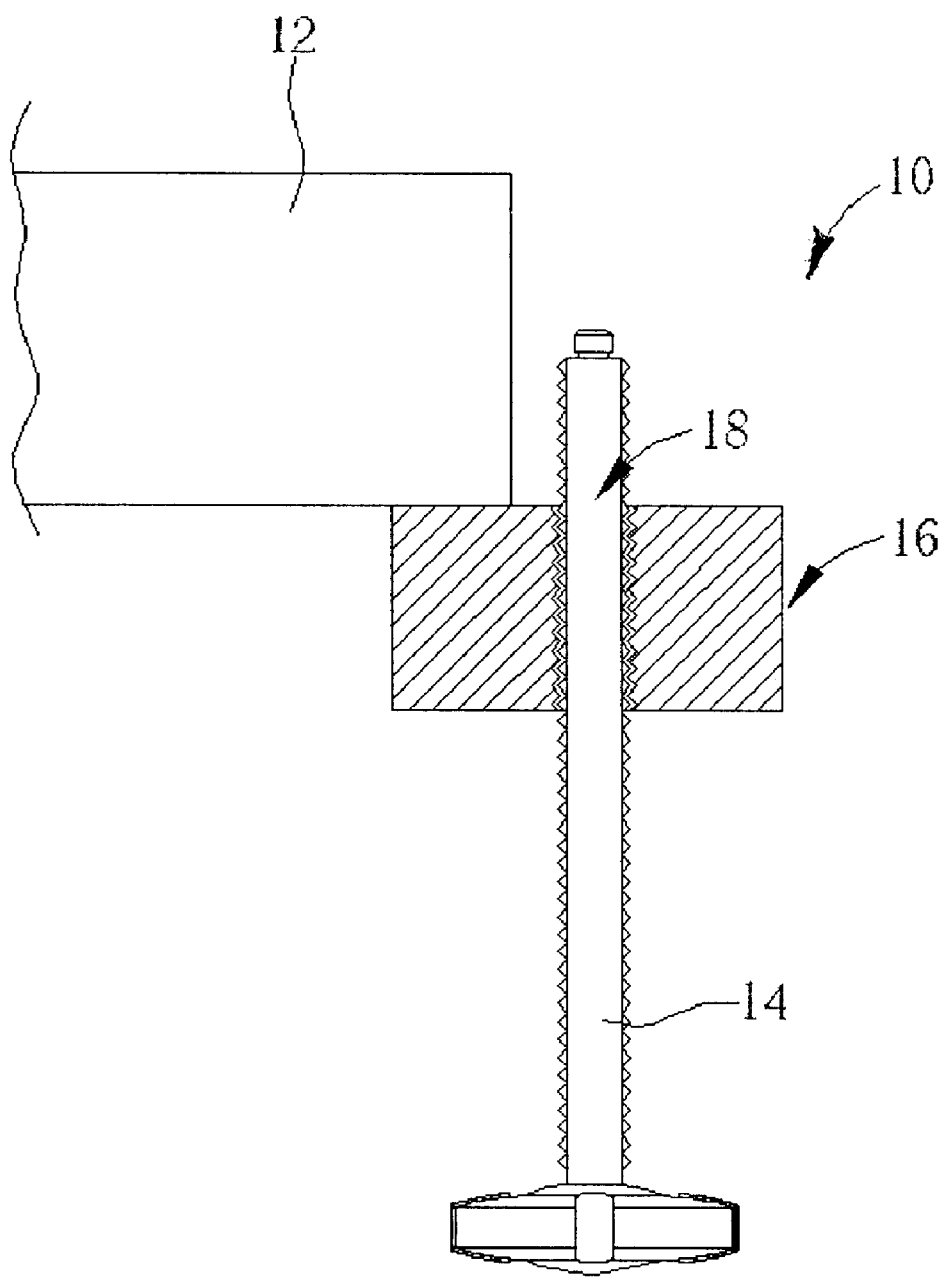
FIG. 1 is a structural diagram of a stand of a prior art projector.
Figure 2:
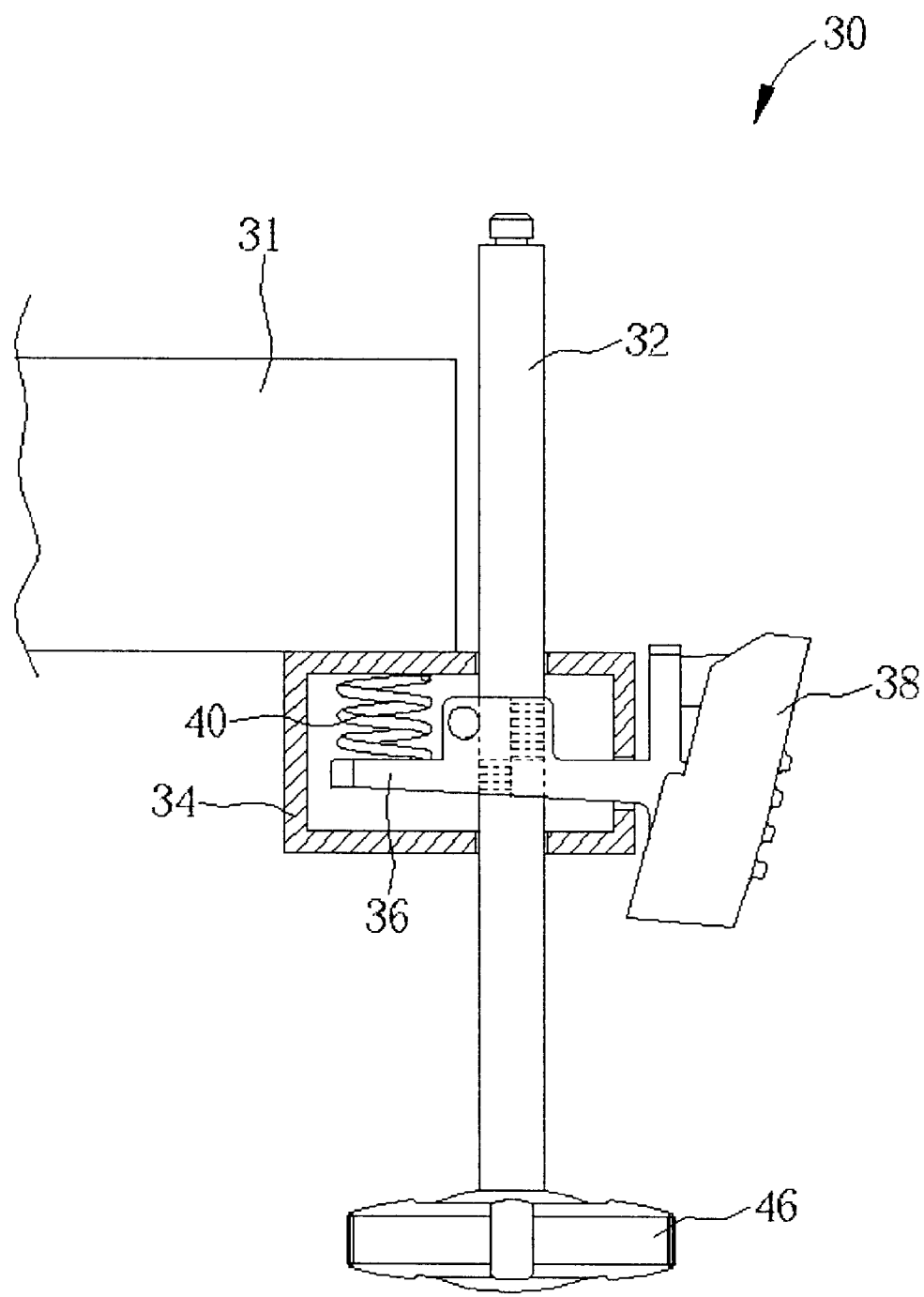
FIG. 2 is an assembly diagram of a stand according to the present invention.
Figure 3:
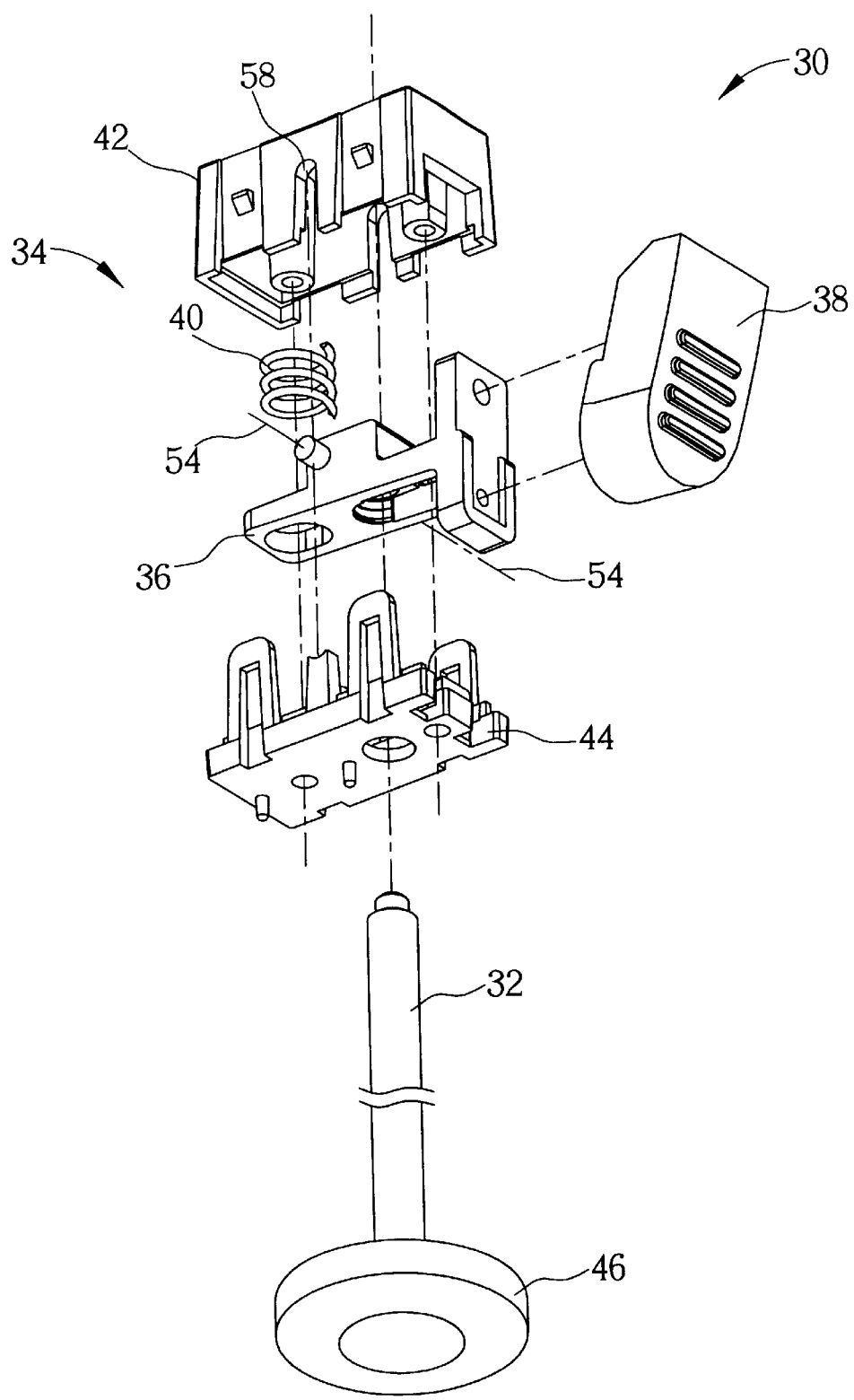
FIG. 3 is a component diagram of the stand shown in FIG. 2.

Please refer to FIG. 2 and FIG. 3. FIG. 2 is an assembly diagram of a stand 30 according to the present invention. FIG. 3 is a component diagram of the stand 30 shown in FIG. 2. The stand 30 is used to support a predetermined device (such as projector, etc.) 31 and to adjust the height or the angle of elevation of the predetermined device. As shown in FIG. 2 and FIG. 3, the stand 30 comprises a screw rod 32, a supporting mechanism 34 installed on the screw rod 32 for supporting the predetermined device 31, an adjusting mechanism 36 installed on the screw rod 32 and connected to the supporting mechanism 34 for adjusting the height of the supporting mechanism 34, a key portion 38 positioned on the adjusting mechanism 36, and a spring 40 installed between the supporting mechanism 34 and the adjusting mechanism 36. The supporting mechanism 34 comprises an upper housing 42 and a lower housing 44. The stand 30 further comprises a base 46 installed on the bottom side of the screw rod 32 with which users can rotate the screw rod 32.

Figure 4:
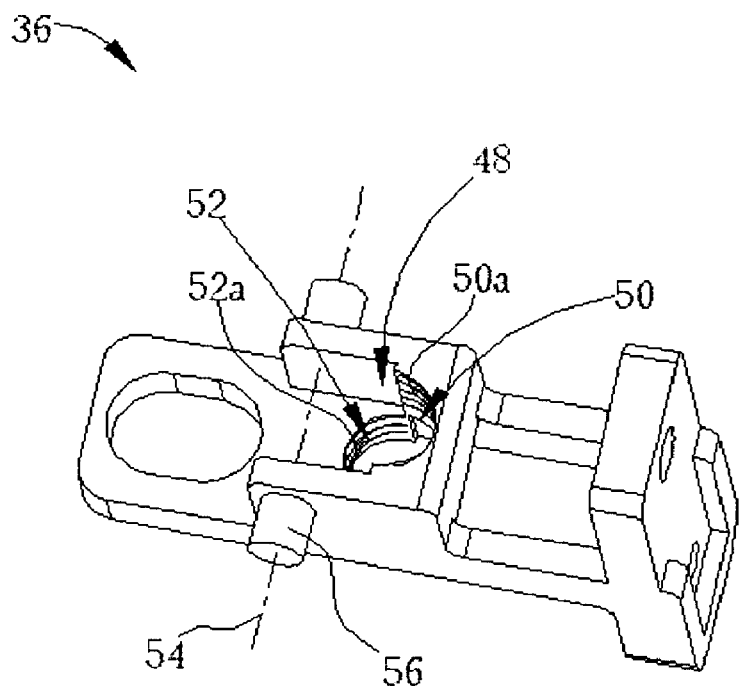
FIG. 4 is a structural diagram of the adjusting mechanism shown in FIG. 3.
Figure 5:
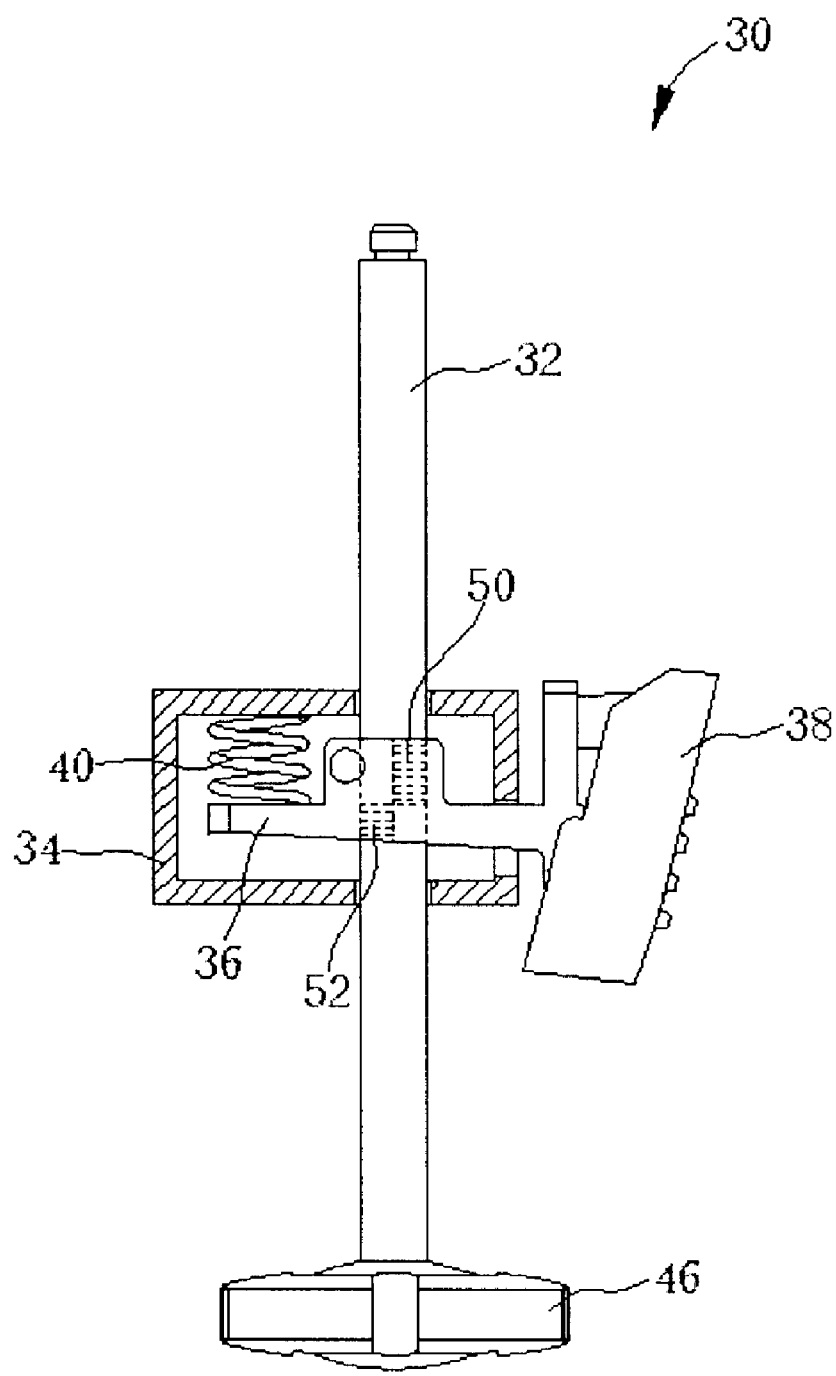
FIG. 5 and FIG. 6 are operational diagrams of the stand in FIG. 2.
Figure 6:
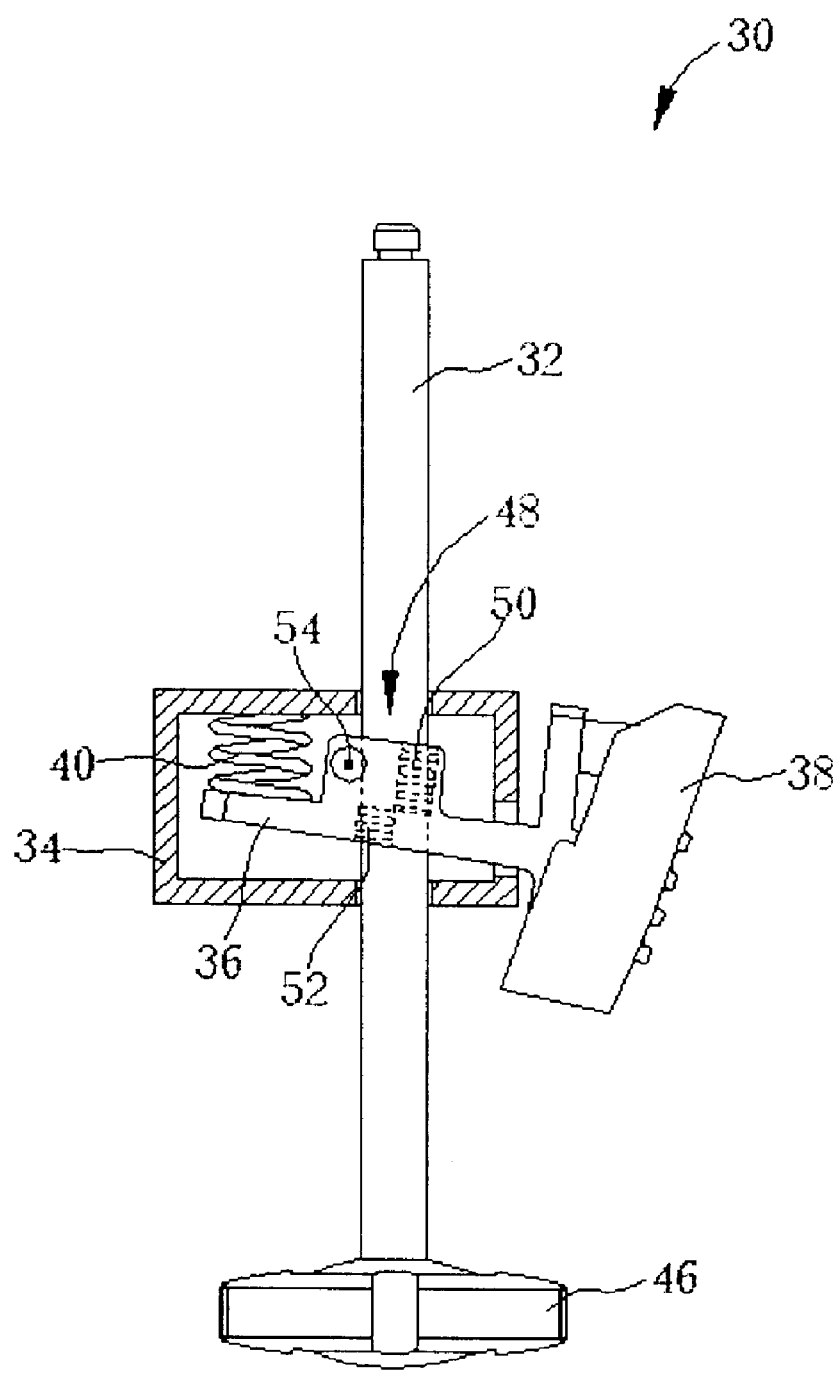

Please refer to FIG. 4. FIG. 4 is a structural diagram of the adjusting mechanism 36 shown in FIG. 3. As shown in FIG. 4, the adjusting mechanism 36 comprises a hole portion 48. The adjusting mechanism 36 is installed on the screw rod 32 through the hole portion 48. The hole portion 48 comprises an upper U-shaped wall 50 positioned on a front-upper region (left region of FIG. 4) of the hole portion 48, and a lower U-shaped wall 52 positioned on a back-lower region (right region of FIG. 4) of the hole portion 48, opposite to the upper U-shaped wall 50. The upper and lower U-shaped walls 50, 52 have a first screw thread 50a and a second screw thread 52a, respectively, which mate with the screw rod 32. This design of the hole portion 48 is able to make the adjusting mechanism 36 tilt at a certain angle over the screw rod 32, causing the upper and lower U-shaped walls 50, 52 to separate from the screw rod 32. FIG. 5 and FIG. 6 will illustrate this operation in detail.

The adjusting mechanism 36 can rotate on an axis 54 and connect with the supporting mechanism 34. The axis 54 is perpendicular to the screw rod 32. The axis 54 and the lower U-shaped wall 52 are on the same side of the hole portion 48 (left side of the hole portion shown in FIG. 4). The adjusting mechanism 36 further comprises two axles 56 installed on the axis 54, and the supporting mechanism 34 comprises the corresponding hole 58 (formed by the upper and lower housing 42, 44, please refer to FIG. 3) for engaging with the axle so that the adjusting mechanism 36 can rotate over the supporting mechanism 34.

Please refer to FIG. 5 and FIG. 6. FIG. 5 and FIG. 6 are operational diagrams of the stand 30. FIG. 5 shows that the stand 30 is in a steady and fine-adjustable state. As shown in FIG. 5, when users do not depress the key portion 38, the spring 40 will exert pressure on the left side of the adjusting mechanism 36 so that the upper and lower U-shaped walls 50, 52 contact the screw rod 32. In this state, a thread of the screw rod 32 is engaged with the first and second screw thread 50a, 52a of the upper and lower U-shaped wall 50, 52. The supporting mechanism 34 and the adjusting mechanism 36 are fixed to the screw rod 32 and will not accidentally slide. To adjust the height of the supporting mechanism 34, users rotate the base 46 and the screw rod 32.

FIG. 6 shows the stand 30 in a rough adjustable state. As shown in FIG. 6, when the key portion 38 is depressed, the adjusting mechanism 36 is able to rotate along the axis 54. The screw threads 50a, 52a of the upper and lower U-shaped wall 50, 52 of the hole portion 48 do not make contact with the screw rod 32 so that the adjusting mechanism 36 can tilt at a predetermined angle over the screw rod 32. When the adjusting mechanism 36 tilts, the upper and lower U-shaped walls 50, 52 will separate from the screw rod 32 allowing the adjusting mechanism 36 and the supporting mechanism 34 to slide along the screw rod 32. In this state, users are able to rapidly and conveniently adjust the height of the supporting mechanism 34.

Figure 7:
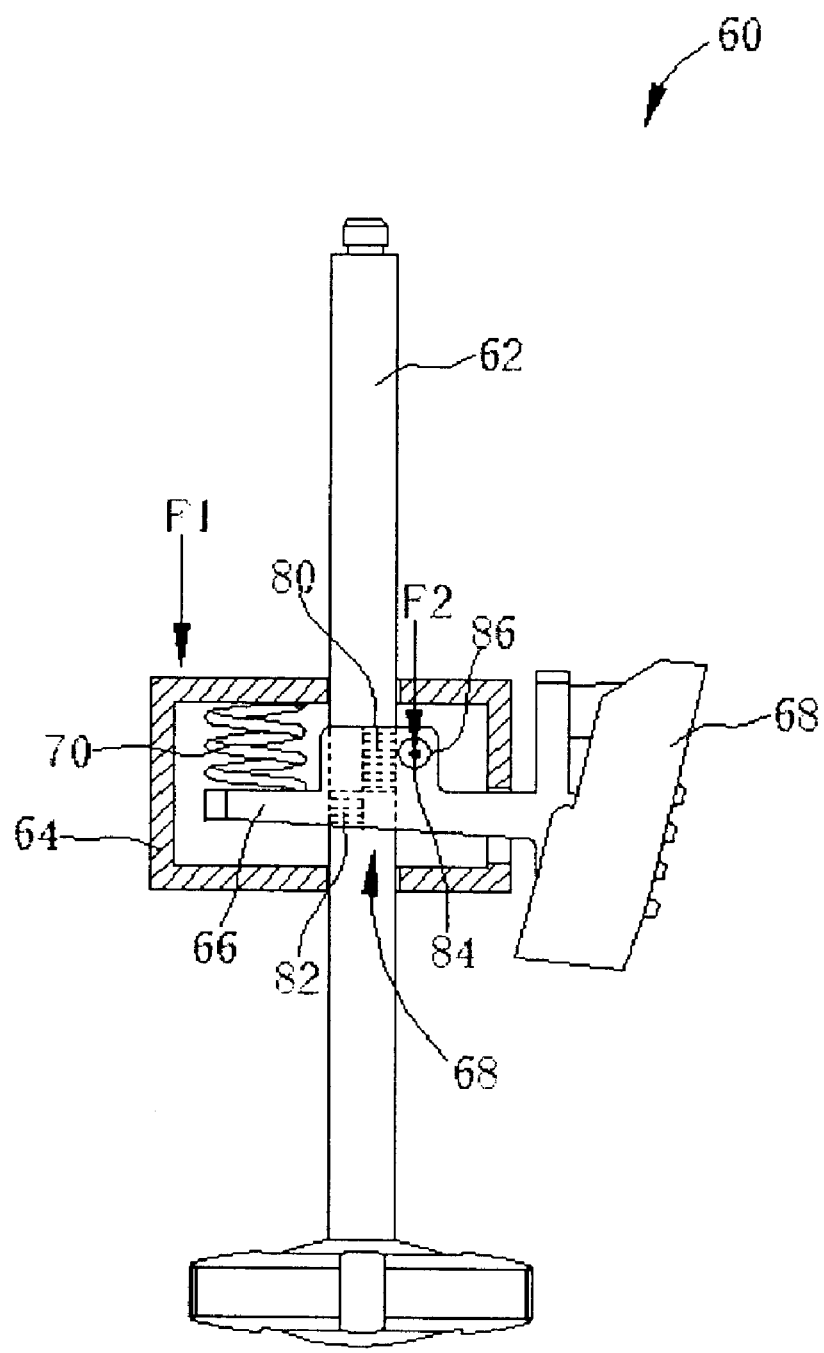
FIG. 7 and FIG. 8 are operational diagrams of another stand according to the present invention.
Figure 8:
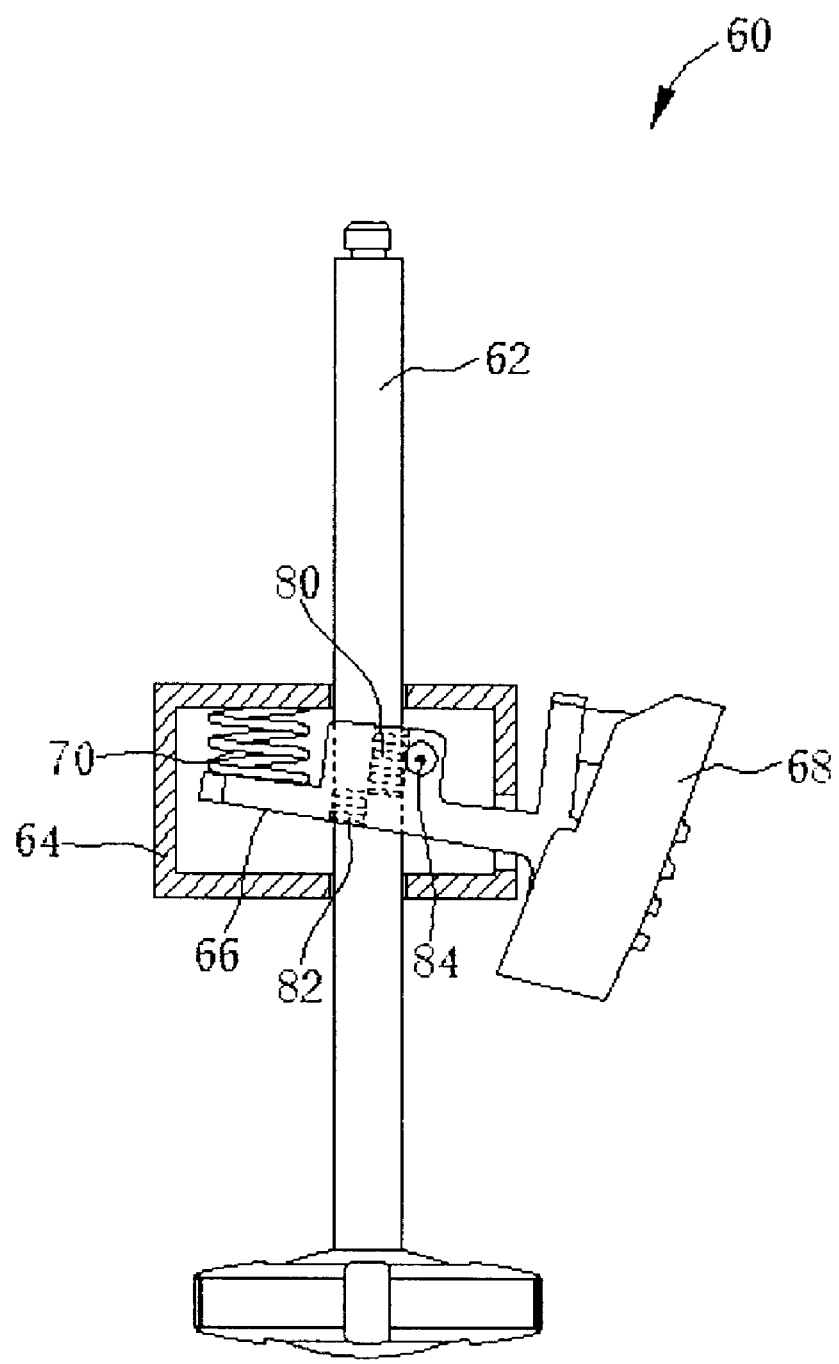

Please refer to FIG. 7 and FIG. 8. FIG. 7 and FIG. 8 are operational diagrams of another stand 60 according to the present invention. The stand 60 is also capable of fine adjustment and rough adjustment. FIG. 7 shows that the stand 60 is in a fine adjustable state. FIG. 8 shows that the stand 60 is in rough adjustable state. Users can do rough adjustment by depressing the key portion 68. The operational principles are similar to the stand 30 mentioned above. The difference between this stand 60 and the stand 30 mentioned above is that the axis 84 and the upper U-shaped wall 80 of this stand 60 are on the same side of the hole portion 68 (the right side of the hole portion 68 shown in FIG. 7). In the state shown in FIG. 7, if users push down on the supporting mechanism 64 directly, the supporting mechanism 64 and the adjusting mechanism 66 will slide downward. As shown in FIG. 7, when users push down on the supporting mechanism 64 (as F1 shown in FIG. 7), pressure will be exerted on the axle 86 of the adjusting mechanism 66 (as F2 shown in FIG. 7) so that the adjusting mechanism 66 tilts at a certain angle over the screw rod 62. This will cause the upper and lower U-shaped walls 80, 82 to separate from the screw rod 62, and allow the adjusting mechanism 66 and the supporting mechanism 64 to slide downward along the screw rod 32. When users stop pressing the supporting mechanism 64, the spring 70 will make the upper and lower U-shaped walls 80, 82 contact the screw rod 62. This will cause the supporting mechanism 64 and the adjusting mechanism 66 to remain fixed on the screw rod 62. This design allows users to press down directly on the supporting mechanism 64 in order to quickly lower its height. Of course, the elastic force of the spring 70 must be sufficiently strong to prevent the supporting mechanism 64 from sliding down as a result of the weight of the predetermined device (such as a projector).

The present invention is not only limited to the embodiments mentioned above. All similar designs that use the opposed position of the upper and lower U-shaped walls 50, 52, 80, 82 to make the adjusting mechanism 36, 66 tilt at a certain angle over the screw rod 32, 62 and slide along the screw rod 32, 62 conform to the essence of the present invention.

In contrast to the prior art stand 10, the upper and lower U-shaped walls 50,52,80,82 of the present invention stand 30, 60 do not entirely cover the screw rod 32,62 allowing the adjusting mechanism 36, 66 to tilt a certain angle over the screw rod 32, 62 and separate from the screw rod 32, 62, so that the supporting mechanism 34, 64 is able to slide along the screw rod 32, 62. In this manner, the stand 30, 60 according to the present invention allows for both fine and rough adjustment functions. Users can rapidly and conveniently adjust the supporting mechanism 34, 64 to the desired height.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A stand adapted to support a predetermined device, the stand comprising:
    a screw rod;
    a supporting mechanism for supporting the predetermined device;
    an adjusting mechanism installed on the screw rod and connected to the supporting mechanism for adjusting a height of the supporting mechanism, the adjusting mechanism comprising a hole portion, the adjusting mechanism being installed on the screw rod through the hole portion, the hole portion comprising:
        an upper U-shaped wall positioned on a front-upper region of the hole portion, the upper U-shaped wall having a first screw thread;
        a lower U-shaped wall positioned on a back-lower region of the hole portion, the upper and lower U-shaped walls being opposite to each other and capable of separating from the screw rod, the lower U-shaped wall having a second screw thread; and
    a spring installed between the supporting mechanism and the adjusting mechanism for making the upper and lower U-shaped walls elastically contact the screw rod;
    wherein when the upper and lower U-shaped walls make contact with the screw rod, the adjusting mechanism is capable of moving up and down by rotating the screw rod, and when the upper and lower U-shaped walls separate from the screw rod, the adjusting mechanism is capable of sliding along the screw rod.

2. The stand of claim 1 wherein the supporting mechanism is installed on the screw rod and the adjusting mechanism is capable of rotating on an axis, when the adjusting mechanism rotates on the axis, the adjusting mechanism will tilt a certain angle over the screw rod and the upper and lower U-shaped walls will separate from the screw rod.

3. The stand of claim 2 wherein the adjusting mechanism further comprises at least one axle installed on the axis, and the supporting mechanism comprises a corresponding hole for engaging with the axle so that the adjusting mechanism is capable of rotating over the supporting mechanism.

4. The stand of claim 2 further comprising a key portion positioned on the adjusting mechanism, wherein when the key portion is depressed, the adjusting mechanism will tilt at the certain angle.

5. The stand of claim 2 wherein the axis and the lower U-shaped wall are on the same side of the hole portion.

6. The stand of claim 2 wherein the axis and the upper U-shaped wall are on the same side of the hole portion.

7. The stand of claim 1 further comprising a base installed on a bottom side of the screw rod for rotating the screw rod.

8. The stand of claim 1 wherein the supporting mechanism comprises an upper housing and a lower housing.

9. The stand of claim 1 wherein the predetermined device is a projector.

* * * * *